US012357020B1

(12) United States Patent
Jordan

(10) Patent No.: US 12,357,020 B1
(45) Date of Patent: Jul. 15, 2025

(54) ASHTRAY SYSTEM AND METHOD OF USE

(71) Applicant: Arthur Dee Jordan, Arlington, TX (US)

(72) Inventor: Arthur Dee Jordan, Arlington, TX (US)

( * ) Notice: Subject to any disclaimer, the term of this patent is extended or adjusted under 35 U.S.C. 154(b) by 278 days.

(21) Appl. No.: 18/136,742

(22) Filed: Apr. 19, 2023

Related U.S. Application Data

(60) Provisional application No. 63/332,971, filed on Apr. 20, 2022.

(51) Int. Cl.
| | | |
|---|---|---|
| *A24F 19/09* | (2006.01) | |
| *A24F 19/00* | (2006.01) | |
| *A24F 19/10* | (2006.01) | |
| *G01K 1/02* | (2021.01) | |
| *G01K 1/024* | (2021.01) | |

(52) U.S. Cl.
CPC .......... *A24F 19/09* (2013.01); *A24F 19/0035* (2013.01); *A24F 19/10* (2013.01); *G01K 1/024* (2013.01); *G01K 1/026* (2013.01)

(58) Field of Classification Search
CPC ...... A24F 19/09; A24F 19/0035; A24F 19/10; G01K 1/024; G01K 1/026
See application file for complete search history.

(56) References Cited

U.S. PATENT DOCUMENTS

2012/0200236 A1\* 8/2012 Huang .................... A24F 19/09
315/362

\* cited by examiner

*Primary Examiner* — Michael H. Wilson
*Assistant Examiner* — Ronnie Kirby Jordan
(74) *Attorney, Agent, or Firm* — Richard Eldredge; Leavitt Eldredge Law Firm

(57) ABSTRACT

An ashtray system for monitoring the temperature of a burning tobacco product to facilitate optimal smoking and its method of use, comprising a body having a circular shaped bowl for receiving ashes, positioned on the front end with a cradle extending outwardly from the bowl and communicating with the rear end, a microprocessor, a printed circuit board, a plurality of sensors for detecting the temperature of the burning tobacco product, one or more light source emitting different colors, a power switch to turn the ashtray system ON/OFF and a power source, wherein the plurality of sensors monitor the temperature of the burning tobacco product and visually indicate the temperature through flashing one or more said light sources emitting predetermined colors at predetermined temperatures.

2 Claims, 5 Drawing Sheets

ASHTRAY SYSTEM AND METHOD OF USE

CROSS REFERENCE TO RELATED APPLICATIONS

This application claims the benefit of U.S. Provisional Application 63/332,971, filed Apr. 20, 2022, of which is hereby incorporated by reference in its entirety.

BACKGROUND

1. Field of the Invention

The present invention relates generally to ashtrays, and more specifically to an ashtray system that monitors the temperature of a burning tobacco product for facilitating optimal smoking, thereby providing for an enhanced tobacco smoking experience.

2. Description of Related Art

Ashtrays are well known in the art and are effective means to collect ash and tobacco products in a safe manner. Tobacco is the agricultural product of the leaves of plants in the genus *Nicotiana*, commonly termed tobacco plants. Tobacco products are the term used to refer specifically to those products which contain material from the tobacco plant. Once the tobacco leaves have been grown, harvested, cured, and processed, it is used to produce a number of different products including smoked tobacco products meant for smoking.

Traditionally, a tobacco product wraps a required amount of tobacco in cylindrical form with a cap end and a foot end. The cap end of the tobacco product is cut to allow better transfer of smoke and placed into the user's mouth, and the foot end is lit. While lighting, the user puffs and rotates the tobacco product until the tobacco around the outer rim of the foot end of the tobacco product begins to glow from the heat.

One of the problems associated with common tobacco products is that their use is not intuitive. For example, a burning tobacco product can reach unsuitably high and low temperatures quickly, depending on the user's smoking rate. When a tobacco product is too hot, its flavor becomes compromised and can ruin the user's experience. In contrast, a low temperature can cause the tobacco product to become extinguished and thus, require the user to relight the tobacco product. This is inconvenient and frustrating, especially for beginner tobacco product smokers. Thus, there is a need for a means to aid the user in monitoring a tobacco product's temperature during use.

Accordingly, it is an object of the present application to provide an ashtray system that monitors tobacco product temperature thereby increasing user enjoyment of the tobacco product smoking experience.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
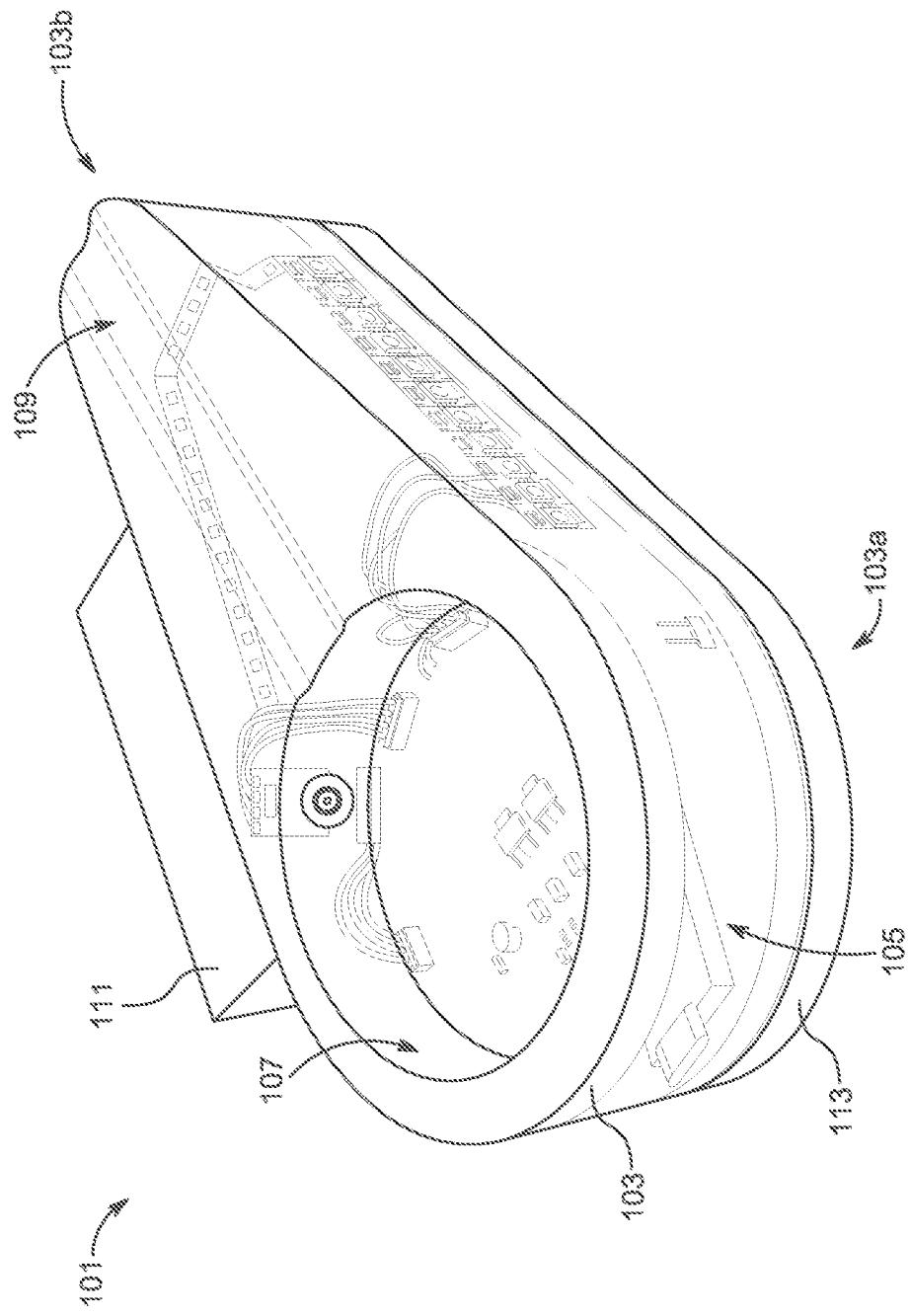
FIG. 1 is a top perspective view of an ashtray system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional tobacco products. Specifically, the system of the present invention provides a means for the user to monitor tobacco product temperature for optimal tobacco product smoking. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
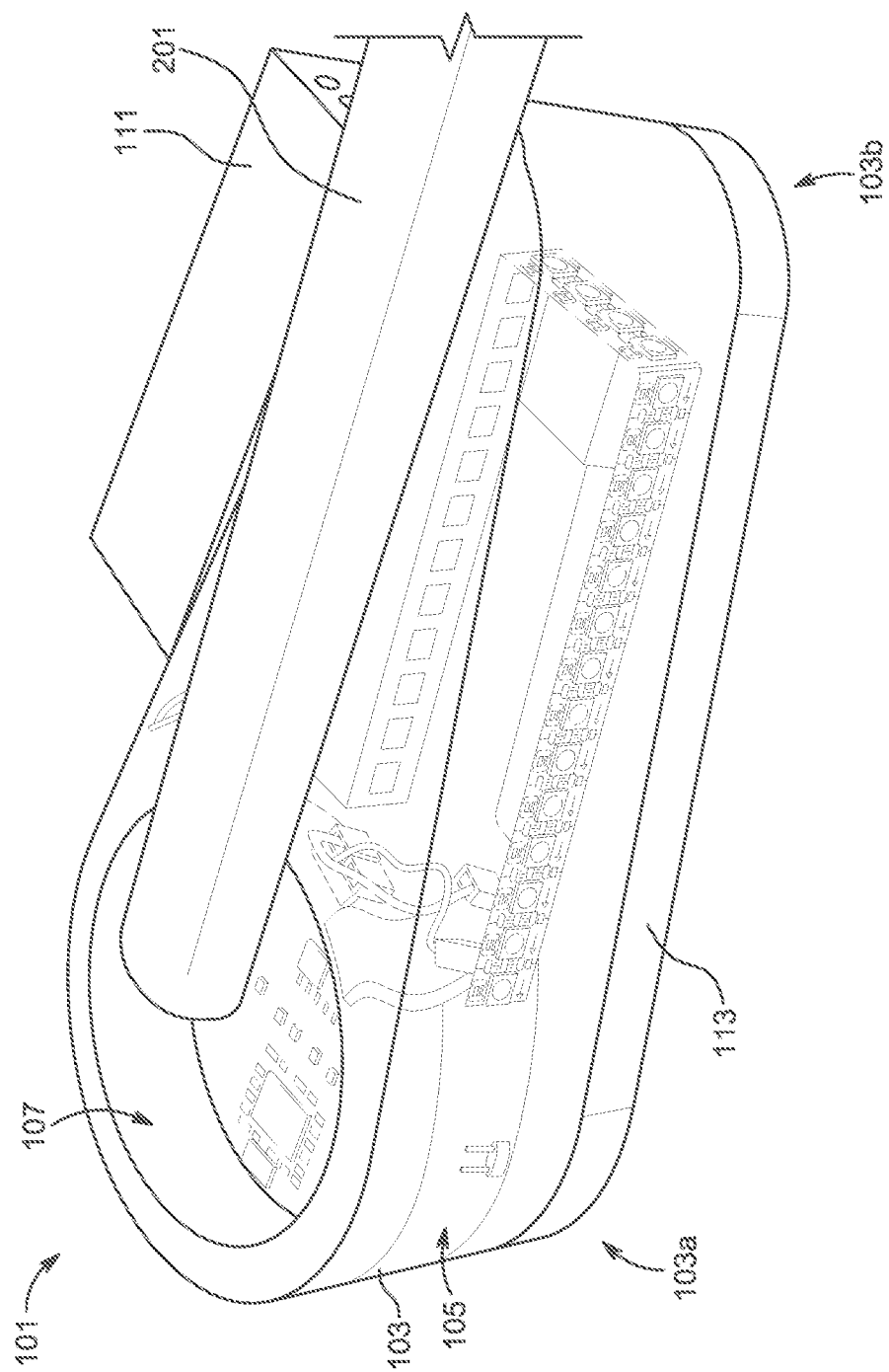
FIG. 2 is a rear perspective view of the ashtray system of FIG. 1, illustrating a tobacco product resting thereon.

Referring now to the drawings wherein like reference characters identify corresponding or similar elements throughout the several views, FIGS. 1 and 2 depict front and rear perspective views of an ashtray system 101, respectively, in accordance with a preferred embodiment of the present application. It will be appreciated that the ashtray system 101 overcomes one or more of the above-listed problems commonly associated with conventional tobacco products.

In the contemplated embodiment, the ashtray system 101 includes a body 103 having a front end 103a and a rear end 103b. The body 103 is configured to house electrical components 105 (described further in FIG. 3) therein. The body 103 includes a generally circular shaped bowl 107 positioned on the front end 103a. The body 103 also includes a cradle 109 extending outwardly from the bowl 107 and communicating with the rear end 103b. The cradle 109 is configured to support a tobacco product 201 resting thereon. The body 103 is conjoined with a compartment 111 on the side, enclosing one or more batteries, a charging port and a switch to be operated in ON/OFF position. The ashtray system 101 may further comprise a base compartment 113, which can house the wiring channel between the body 103 and compartment 111. The base compartment may further comprise a non-slip rubber pad to provide traction and a non-marring bottom surface for the ashtray system.

In the preferred embodiment, the body 103 is made of clear resin. In other embodiments, the body 103 can be made of different colored materials and different colored patterns, among others, according to aesthetical preferences.

Figure 5:
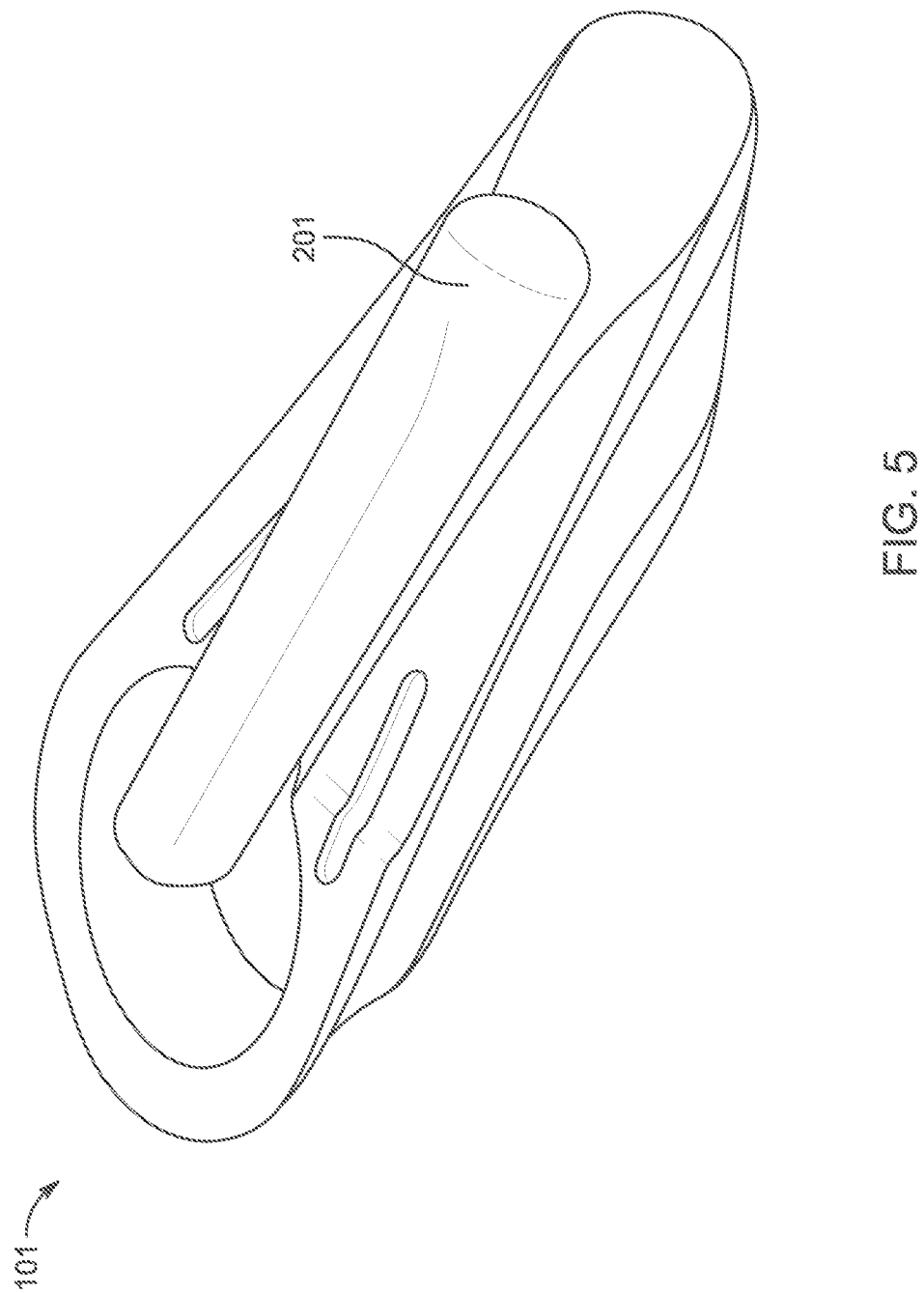
FIG. 5 is a rear perspective view of the ashtray system in accordance with a contemplated embodiment of the present invention.

In the contemplated embodiment, the compartment 111 may be housed within the body 103, and the body 103 may further comprise a transparent light-emitting element as shown in FIG. 5.

The tobacco product described in the present invention can include but not limited to cigars, cigarettes, beedis, blunts, cigarillos, little cigars, cigar wraps, roll-your own cigars, kreteks, and dokha.

Figure 3:
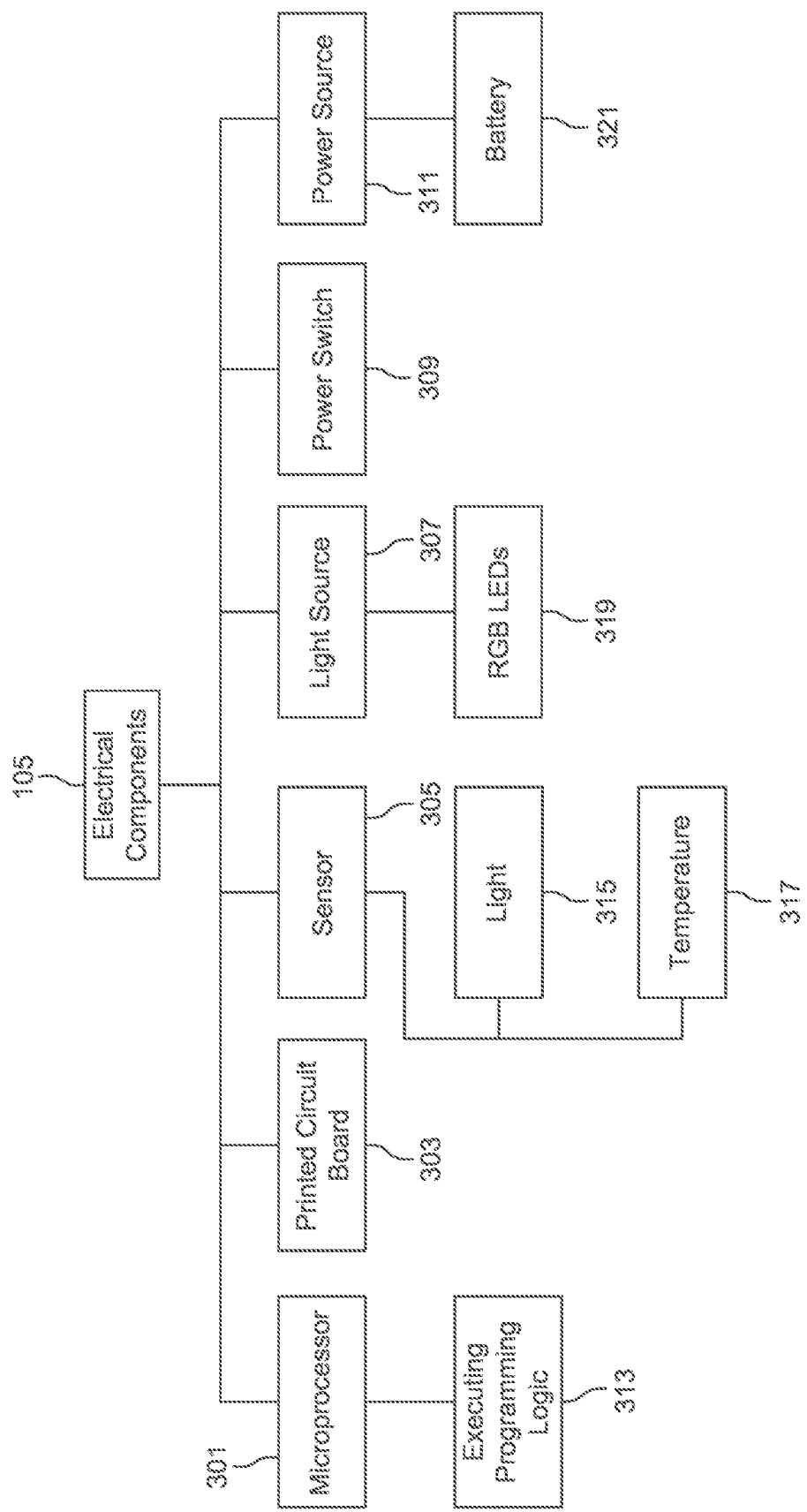
FIG. 3 is a block diagram of electrical components associated with the ashtray system of FIG. 1.

In FIG. 3, a block diagram of electrical components 105 associated with the ashtray system 101 is depicted. As shown, the electrical components 105 include a microprocessor 301, a printed circuit board 303, a plurality of sensors 305, one or more light sources 307, a power switch 309, and a power source 311 in electronic communication therebetween. Other components of the electrical components 105 may be used without departing from the scope of this disclosure. In addition, the electrical components 105 can be built as a separate device that could be placed next to, on or in an existing ashtray.

The microprocessor 301 is configured to execute programming logic 313.

The sensors include 305 one or more light sensors 315 and one or more temperature sensors 317. The light sensor 315 facilitates measuring the brightness of the ashtray environment (indoors, outdoors, day, night, etc.) and adjusting the light source brightness accordingly to optimize power usage. The temperature sensor 317 is configured to take temperature measurements of a burning tip of a tobacco product. When the burning tip reaches predetermined temperatures, the light source 307 emits predetermined colors.

The light source 307 is configured to emit a plurality of colors based on the feedback received from the temperature sensor 317. In the preferred embodiment, the light source is a series of red, green, and blue (RGB) light-emitting diodes (LEDs) 319.

The power switch 309 is configured with a user interface to manually power on and off the ashtray system 101. The power switch 309 can be configured to automatically power off after a predetermined length of time if a lit tobacco product is not resting within the cradle 109.

The power source 311 provides electrical energy to power the ashtray system 101 such as a battery 321.

It should also be appreciated that one of the unique features believed characteristic of the present application is the use of both the temperature sensor and the light source to communicate with the user of the temperature status of a tobacco product, thereby allowing the user to take appropriate action to better enjoy their tobacco product smoking experience.

Figure 4:
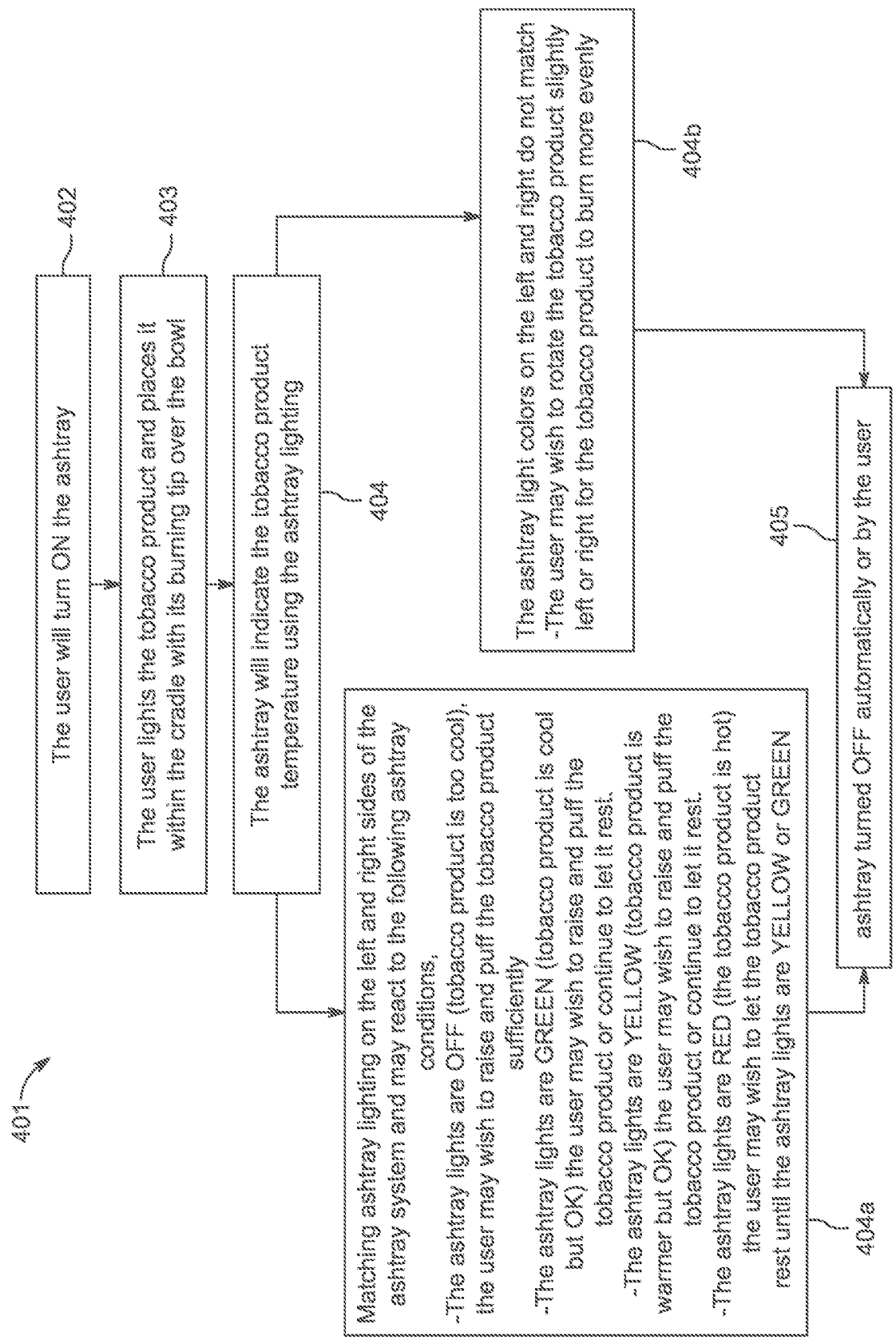
FIG. 4 is a flowchart of a method of use of the ashtray system of FIG. 1.

In FIG. 4, a flowchart 401 depicts a method of use of the ashtray system 101 for optimal smoking, in step 402 the user will turn ON the ashtray. The ashtray will light up for a few seconds, indicating it is on and ready for use. The user may optionally use a wireless smart device connected to the ashtray to monitor ashtray indicators, modify ashtray settings, update ashtray software, etc. In step 403, the user lights the tobacco product and places it within the cradle with its burning tip over the bowl. In step 404, the ashtray will indicate the tobacco product temperature using the ashtray lighting. Temperature ranges and colors are configurable by the user, selecting ideal temperatures for the tobacco product they are smoking. In step 404a, the user observes the matching ashtray lighting on the left and right sides of the ashtray system and may react to the following ashtray conditions, when the ashtray lights are OFF indicating that the tobacco product is too cool, the user may wish to raise and puff the tobacco product sufficiently that the ashtray lights turn green or yellow when returning the tobacco product to rest on the ashtray cradle. when the ashtray lights are green indicating that the tobacco product is cool but ok, the user may wish to raise and puff the tobacco product or continue to let it rest. when the ashtray lights are yellow indicating that the tobacco product is warmer but ok, the user may wish to raise and puff the tobacco product or continue to let it rest. when the ashtray lights are red indicating that the tobacco product is hot, the user may wish to let the tobacco product rest until the ashtray lights are yellow or green.

In step 404b, when the ashtray light colors on the left and right do not match, indicating that the tobacco product is burning unevenly and one side is hotter than the other side, the user may wish to rotate the tobacco product slightly left or right until the warmer side of the tobacco product is facing downward to improve the opportunity for the tobacco product to burn more evenly.

In step 405, when the user finishes smoking the tobacco product, the user may turn the ashtray OFF. The ashtray may optionally turn itself OFF after a configurable period of inactivity.

The ashtray system settings for temperatures and colors in step 404a can include but not limited to ashtray lights in OFF configuration when burning temperatures of the tobacco products are less than 350° F., ashtray lights in ON configuration and in green color when burning temperatures of the tobacco products are between 350° F.-424° F., ashtray lights in ON configuration and in yellow color when burning temperatures of the tobacco products are between 425° F.-499° F., ashtray lights in ON configuration and in red color when burning temperatures of the tobacco products are at or above 500° F.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An ashtray system for monitoring a tobacco product temperature, for an optimal smoking experience, comprising:
    a body having a circular shaped bowl for receiving ashes, positioned on the front end with a cradle extending outwardly from the bowl and communicating with the rear end;
    a microprocessor;
    a printed circuit board;
    a plurality of sensors for detecting the temperature of the burning tobacco product;
    one or more light source emitting different colors;
    a power switch to turn the ashtray system ON/OFF; and
    a power source;
    wherein the said cradle is configured to support a tobacco product resting thereon;
    wherein the said plurality of sensors monitor the temperature of the burning tobacco product and visually indicate the temperature through flashing one or more said light sources emitting predetermined colors at predetermined temperatures.

2. A method for facilitating optimal smoking of a burning tobacco product, the method comprising:
    turning on an ashtray system of claim 1 by the user;
    lighting of the tobacco product and placing it within the cradle with its burning tip over the bowl by the user;
    indicating the tobacco product temperature using the ashtray lighting emitting predetermined colors at the predetermined temperatures allowing the user to take appropriate action; and
    turning off the ashtray system upon finishing the smoking of the tobacco product.

* * * * *